J. CATHRILL.
VALVE LOCK.
APPLICATION FILED AUG. 11, 1919.

1,422,336.

Patented July 11, 1922.

INVENTOR
Jack Cathrill

By R. S. Burry
Attorney.

UNITED STATES PATENT OFFICE.

JACK CATHRILL, OF LOS ANGELES, CALIFORNIA.

VALVE LOCK.

1,422,336. Specification of Letters Patent. Patented July 11, 1922.

Application filed August 11, 1919. Serial No. 316,914.

*To all whom it may concern:*

Be it known that I, JACK CATHRILL, a citizen of the United States, residing at Los Angeles, in the county of Los Angeles and State of California, have invented new and useful Improvements in Valve Locks, of which the following is a specification.

My invention relates to a lockable stop cock for conduits which are carriers of valuable fluids such as gasoline and the like, and the object of my invention is to provide a valve that can be locked in a closed position.

Another object being to provide means in such a valve that, when in a fully opened position, will hold the valve from drifting or becoming closed through accidental cause, such as vibration.

A further object is to construct such a valve lock of heavy design and one that can be locked with an ordinary padlock.

The invention is illustrated in the accompanying drawings; in which.

Figure 1:
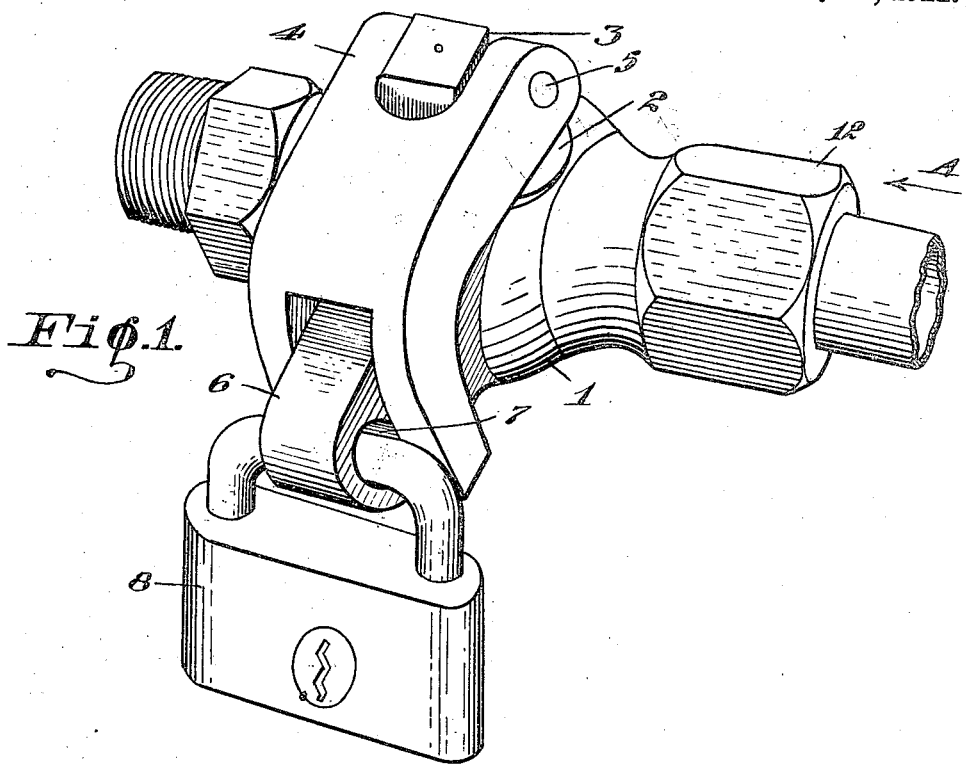
Figure 1 is a perspective view of the device showing it in a closed and locked position.

More specifically 1 indicates a valve body carrying a plug valve 2, the top part of which terminates in a stem 3. 4 indicates a lock hasp which also serves as a handle for the valve stem, the hasp being pivotally connected to the valve stem by a pin 5 and preferably formed with a downwardly curved forked outer end.

From the side of the valve body is projected a lug 6 having a hole 7 in the outer end adapted to receive the bar of a padlock 8; the lug extending at right angles to the length of the valve body.

The valve 2 is held in its seat by a spring 8', surrounding an extension of the valve which passes out through the bottom of the valve body, and carries the nut 9 on its lower end, the spring operating between the nut 9 and an upper washer 10, as is common in stop-cock construction.

The operation of the device is obvious, and an instance in its application, on the gasoline of a motor vehicle is here cited.

With the device mounted on the conduit leading from a source of fuel supply to the carburetor of the engine of a motor vehicle, when it is required that the vehicle shall be left for a time, to protect it against theft, the operator may turn the hasp 4 of the valve down to position the forked end thereof astride the lug 6, insert the bar of the padlock 8 through the hole 7 locking the same, thereby preventing the flow of fuel to the motor of the vehicle.

Figure 2:
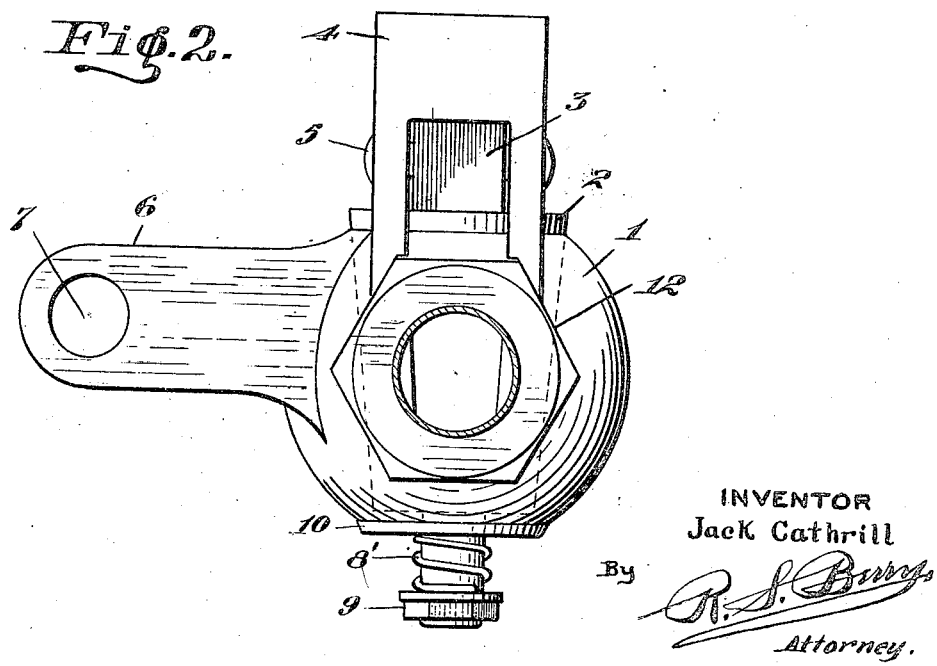
Figure 2 is an end view of the valve as seen in the direction of the arrow A Figure 1, the valve being here shown in an open position.

When the operator desires to again operate the vehicle the padlock 8 is unlocked and removed, the hasp 4 is raised out of engagement with the lug 6 and by it the plug 3 is turned one-fourth of a revolution opening the valve to its maximum position. The hasp is then dropped down over the hexagonal end 12 of the valve body which it straddles as shown in Figure 2 thus insuring the valve from closing by reason of the vibration of the vehicle.

The lock valve may have the lug 6 projecting from either side so that the lock and hasp may face properly and conveniently in any of the various places where the device may be installed.

The valve here shown may be employed in lieu of the ordinary stop-cock generally used on the gasoline line of an auto vehicle or it may be used as an auxiliary stop cock, as occasion may require.

I claim:

In a valve, a valve casing, a keeper lug on said casing, a rotary valve in the casing projecting from the side thereof at right angles to its length, an arm pivoted on said valve having a forked outer end adapted to extend astride a portion of the valve casing when the valve is in its open position and to extend astride the keeper lug when the valve is in its closed position, and means for locking said arm on the keeper lug.

JACK CATHRILL.